(12) United States Patent
Delay

(10) Patent No.: US 6,514,021 B2
(45) Date of Patent: Feb. 4, 2003

(54) T-FLANGE ENGAGING LOAD BEARING BED

(76) Inventor: David A. Delay, 1279 SW. Diamond Rd., Towanda, KS (US) 67144-9191

( * ) Notice: Subject to any disclaimer, the term of this patent is extended or adjusted under 35 U.S.C. 154(b) by 0 days.

(21) Appl. No.: 09/796,904

(22) Filed: Feb. 28, 2001

(65) Prior Publication Data

US 2002/0119023 A1 Aug. 29, 2002

(51) Int. Cl.$^7$ ................................................. B60P 7/08
(52) U.S. Cl. ............................ 410/90; 410/67; 410/80; 410/91; 410/104
(58) Field of Search ........................... 410/66, 67, 80, 410/90, 91, 104, 105; 296/39.2, 182

(56) References Cited

U.S. PATENT DOCUMENTS

| | | | | |
|---|---|---|---|---|
| 2,052,914 A | * | 9/1936 | Williams | 410/105 X |
| 2,735,377 A | * | 2/1956 | Elsner | 410/105 |
| 2,858,774 A | * | 11/1958 | Batten | 410/67 |
| 3,353,780 A | * | 11/1967 | Young | 410/104 |
| 3,478,995 A | * | 11/1969 | Lautzenhiser et al. | 410/104 |
| 3,504,636 A | * | 4/1970 | Adler | 410/67 |
| 3,508,764 A | * | 4/1970 | Dobson et al. | 410/90 |
| 3,877,671 A | * | 4/1975 | Underwood et al. | 410/104 X |
| 3,972,500 A | * | 8/1976 | Johnson et al. | 410/104 X |
| 4,199,188 A | | 4/1980 | Albrecht et al. | |
| 5,098,146 A | | 3/1992 | Albrecht et al. | |
| 5,137,405 A | * | 8/1992 | Klein | 410/94 |
| 5,674,033 A | * | 10/1997 | Ruegg | 410/104 |
| 5,816,637 A | | 10/1998 | Adams et al. | |
| 5,827,022 A | * | 10/1998 | Tovani | 410/78 |
| 5,931,632 A | | 8/1999 | Dongilli et al. | |

* cited by examiner

Primary Examiner—Stephen T. Gordon
(74) Attorney, Agent, or Firm—Kenneth H. Jack

(57) ABSTRACT

A T-flange engaging load bearing bed consisting of a metal sheet having an upper load bearing surface, a lower surface, and having a post receiving slot, and further consisting of a C-channel beam having an upwardly opening T-receiving channel, the C-channel beam being fixedly attached to the lower surface of the metal sheet so that the upwardly opening T-receiving channel underlies the post receiving slot.

9 Claims, 5 Drawing Sheets

T-FLANGE ENGAGING LOAD BEARING BED

FIELD OF THE INVENTION

This invention relates to load bearing beds which are installable upon or utilized as a component of pickup trucks, flat bed trucks, trailers, cargo ships, cargo airplanes, and other cargo transporting vehicles. More particularly, this invention relates to such load bearing beds incorporating T-flange engaging tie down means or equipment supporting means.

BACKGROUND OF THE INVENTION

Conventional load bearing beds commonly incorporate recessed tie down rings or brackets, or incorporate fixed point slip joint brackets for fixed installation of cargo retaining equipment. Such load bearing beds are cumbersome to utilize, and are uneconomically constructed due to the numerosity of tie downs or slip joint attachments which must be incorporated as part of the load bearing bed space in order to provide flexibility in cargo placement. The instant inventive T-flange engaging load bearing bed solves such problems posed by such conventional load bearing beds by providing a C-channel beam reinforced slotted load bearing bed; such beams in combination with slots reinforcing the bed while forming T-flange engaging slots.

BRIEF SUMMARY OF THE INVENTION

In its simplest expression, the instant inventive T-flange engaging load bearing bed comprises an upper stratum of sheet material, such sheet having an upper load bearing surface and a lower surface. Preferably, the sheet is composed of steel or aluminum. However, suitably, the sheet may be composed of materials such as fiberglass, plastic, composite board, or plywood. Typically, the sheet has a rectangular shape matching the common rectangular shapes of trailer cargo spaces, pickup truck cargo spaces, and the like. Suitably, the sheet may be differently shaped.

The sheet necessarily has at least a first post receiving slot adapted for receiving the post or web of a T-flange. Preferably, the lateral dimension of the post receiving slot is from one-fourth inch to one-half inch. However, other dimensions narrower or wider may be suitably utilized. An upwardly opening C-channel beam is preferably welded to the undersurface of the sheet so that its upwardly opening channel aligns with and underlies the slot. Upon such configuration, the hollow bore of the C-channel beam forms a T-receiving space which, in conjunction with the overlying slot forms a T-flange engaging T-channel. Necessarily, the lateral dimension of such channel is greater than the lateral dimension of the slot it underlies. In addition to its function as a component of the T-flange receiving channel, the C-channel beam functions to provide structural support and rigidity to the slotted sheet.

Preferably, the present inventive T-flange engaging load bearing bed comprises a plurality of substantially parallel post engaging slots, each having an underlying C-channel beam as described above. Also preferably, the inventive load bearing bed further comprises a plurality of perpendicularly oriented intersecting slots, each such slot similarly having an underlying C-channel beam, the perpendicular underlying C-channel beams preferably intersecting longitudinally extending beams at mitered joints.

Preferably, inset roller receiving races extend along the left and right sides or forward and rearward sides (as the case may be) of the post receiving slots, such races allowing T-flanges which are further configured as roller supports to dually function as an equipment bracket securing means and as equipment rollable moving means.

Accordingly, it is an object of the present invention to provide a load bearing bed adapted for engagement of T-flanges.

It is a further object to provide such a bed which facilitates rolling movement of such T-flanges.

Other and further objects, benefits, and advantages of the present invention will become known to those skilled in the art upon review of the Detailed Description which follows, and upon review of the appended drawings.

DETAILED DESCRIPTION OF A PREFERRED EMBODIMENT

Figure 1:
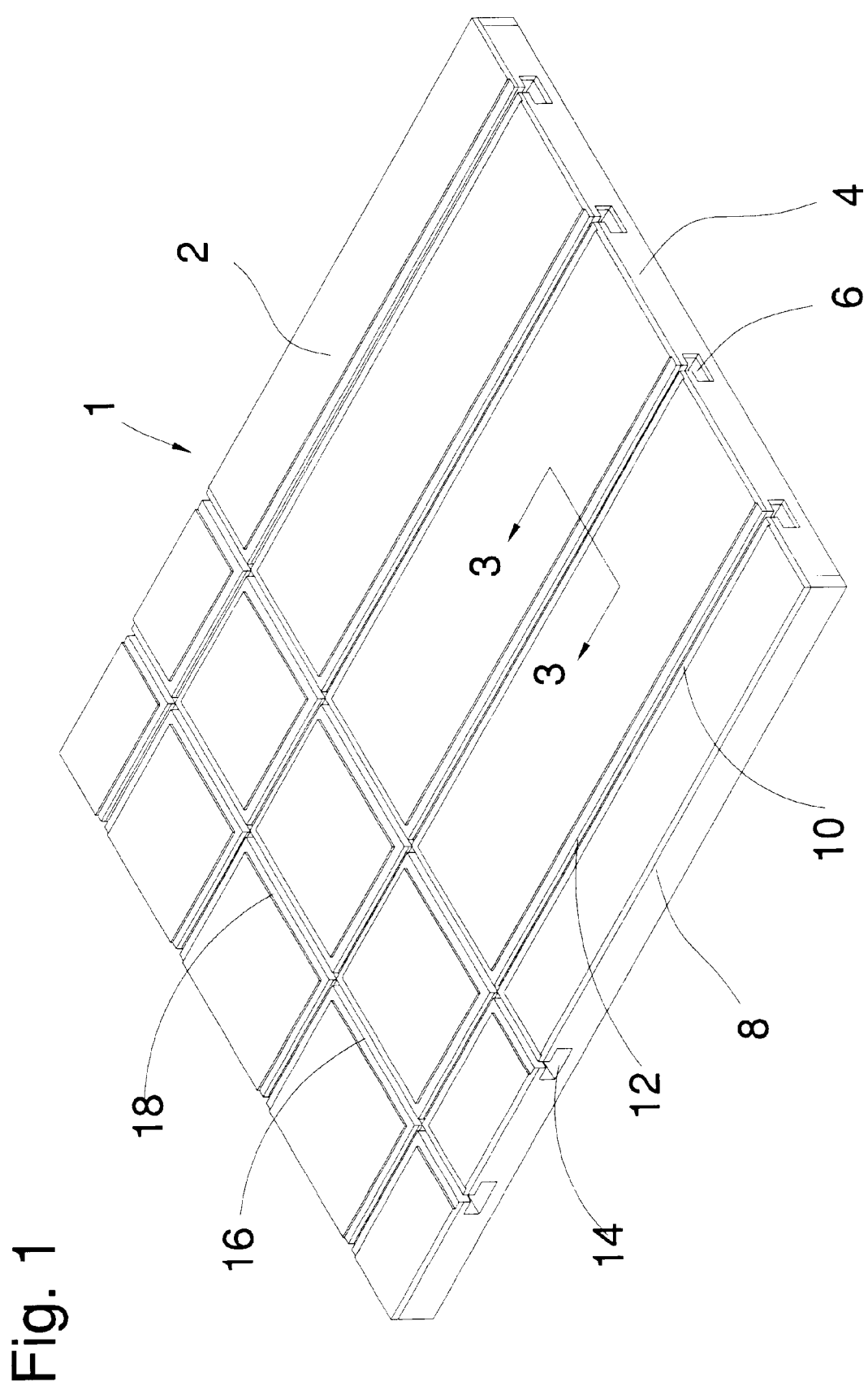
FIG. 1 is an isometric view of a preferred embodiment of the present inventive T-flange engaging load bearing bed.

Referring now to the drawings, and in particular to FIG. 1, the present inventive T-flange engaging load bearing bed is referred to generally by reference arrow 1. Preferably, the bed 1 is rectangular in shape, matching the common shape of cargo spaces of trucks, trailers, trains, cargo ships, and the like. The shape of the load bearing bed 1 may be suitably configured other than rectangularly to match differently shaped vehicle load carrying spaces.

Referring further to FIG. 1, a major structural component of the T-flange engaging load bearing bed 1 is an upper stratum of sheet material 2. Preferably, the sheet 2 is composed of steel or aluminum. However, sheet 2 may suitably be composed of composite board, plywood, plastic, or fiberglass.

Referring further to FIG. 1, the inventive T-flange engaging load bearing bed 1 preferably has a plurality of longitudinally extending post or web engaging slots 12, and has a plurality of intersecting laterally extending post or web engaging slots 16. Preferably, slots 12 are substantially parallel to each other, and preferably slots 16 are substantially parallel to each other; slots groups 12 and 16 being substantially perpendicular to each other. Preferably, the left and right or forward and rearward sides, as the case may be, of slots 12 and 16 are lined with inset roller receiving races 10 and 18.

Figure 2:
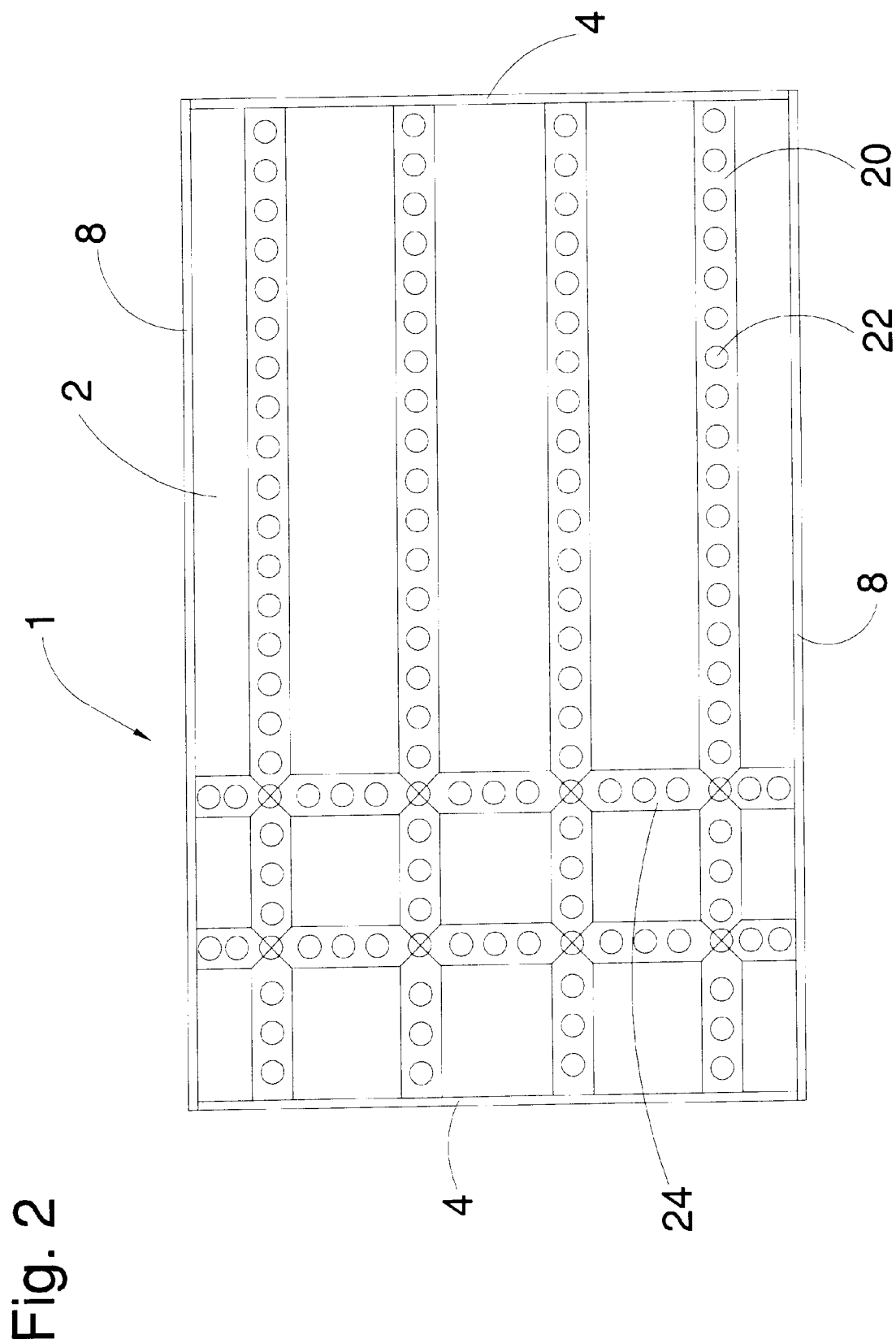
FIG. 2 is a plan view of the under surface of the bed depicted in FIG. 1.

Referring simultaneously to FIGS. 1 and 2, for purposes of enhanced structural rigidity, it is preferred that the forward and rearward edges of sheet 2 be reinforced by downwardly extending flanges 4, while the left and right edges of sheet 2 are reinforced with downwardly extending flanges 8.

Figure 3:
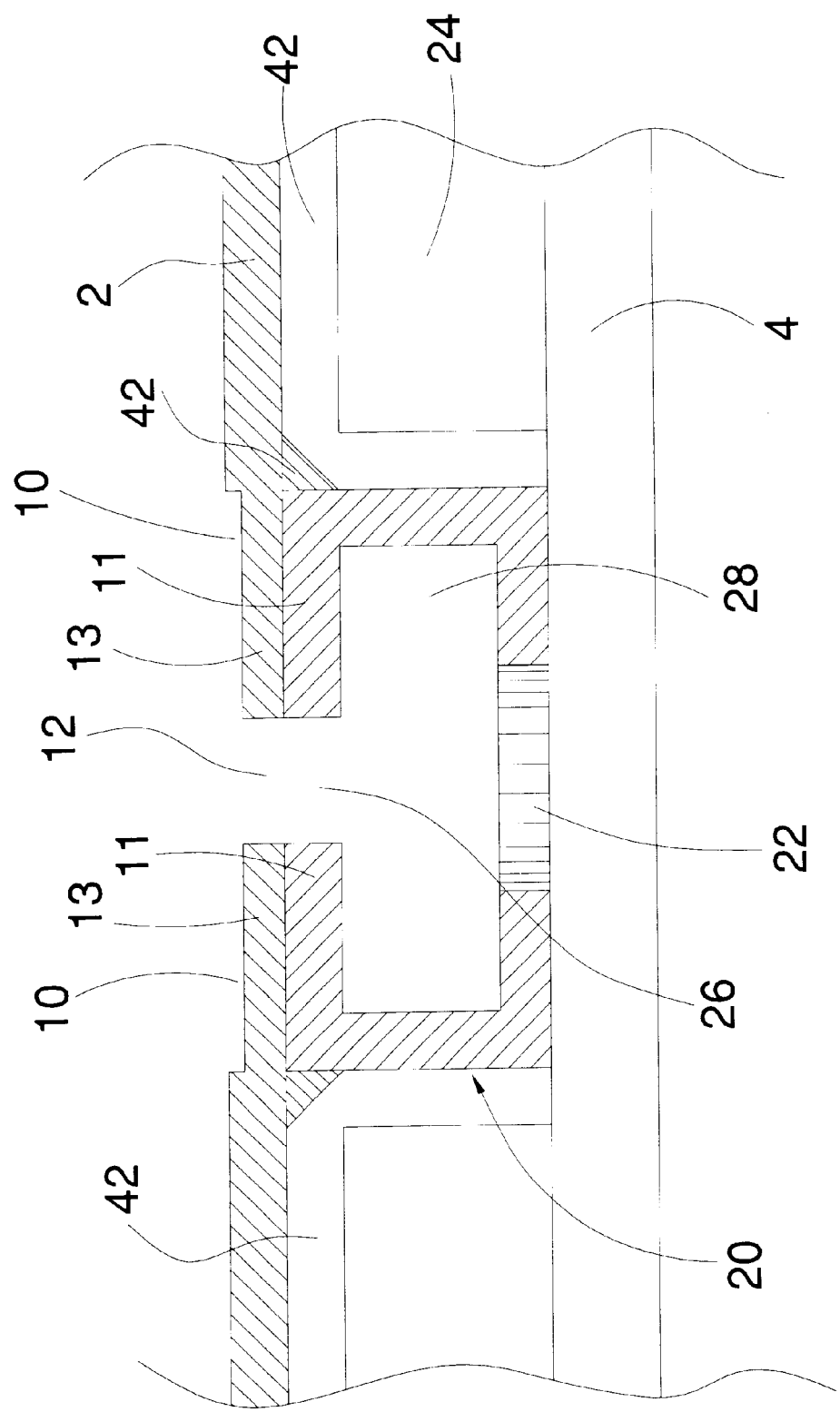
FIG. 3 is a sectional view as indicated in FIG. 1.

Referring simultaneously to FIGS. 1, 2, and 3, pluralities of longitudinally extending and laterally extending C-channel beams 20 and 24 are fixedly attached to the under surface of sheet 2 by means of heat fusion welds 42. The hollow bore of each C-channel beam 20 or 24 forms an upwardly opening T-receiving space 28, the upper opening 26 being in alignment with post receiving slot 12 or 16, as the case may be. Other attaching means (not depicted) which may be suitably utilized for interconnecting C-channel beams 20 or 24 to the under surface of sheet 2 include rivets, spirally threaded bolts, spirally threaded screws, and adhesives.

Referring simultaneously to FIGS. 1 and 3, it can be seen that the post receiving slots 12 and 16 in combination with the inset races 10 and 18 structurally weaken the sheet 2, subjecting sheet zones 13 which underlie races 10 and 18 to damage or deformation. In order to lessen the likelihood of such damage or deformation, it is preferred that the C-channel beams 20 and 24 comprise left and right or forward and rearward, as the case may be, inwardly extending flanges 11. Such flanges 11 dually function to form opening 26 which extends post receiving slots 12 or 16, and to structurally reinforce zones 13.

Referring simultaneously to FIGS. 1, 2, and 3, it is commonly known that dirt and debris may fall upon the upper surface of load bearing beds such as the instant inventive T-flange engaging bed 1. Such dirt and debris will tend to fall into and through post engaging slots 12 and 16. Such dirt and debris potentially accumulates within T-receiving channels 28, interfering with the function of such channels. To facilitate removal of such dirt and debris, it is preferable that the floors of C-channel beams 20 and 24 have a multiplicity of clean out apertures 22.

Figure 4:
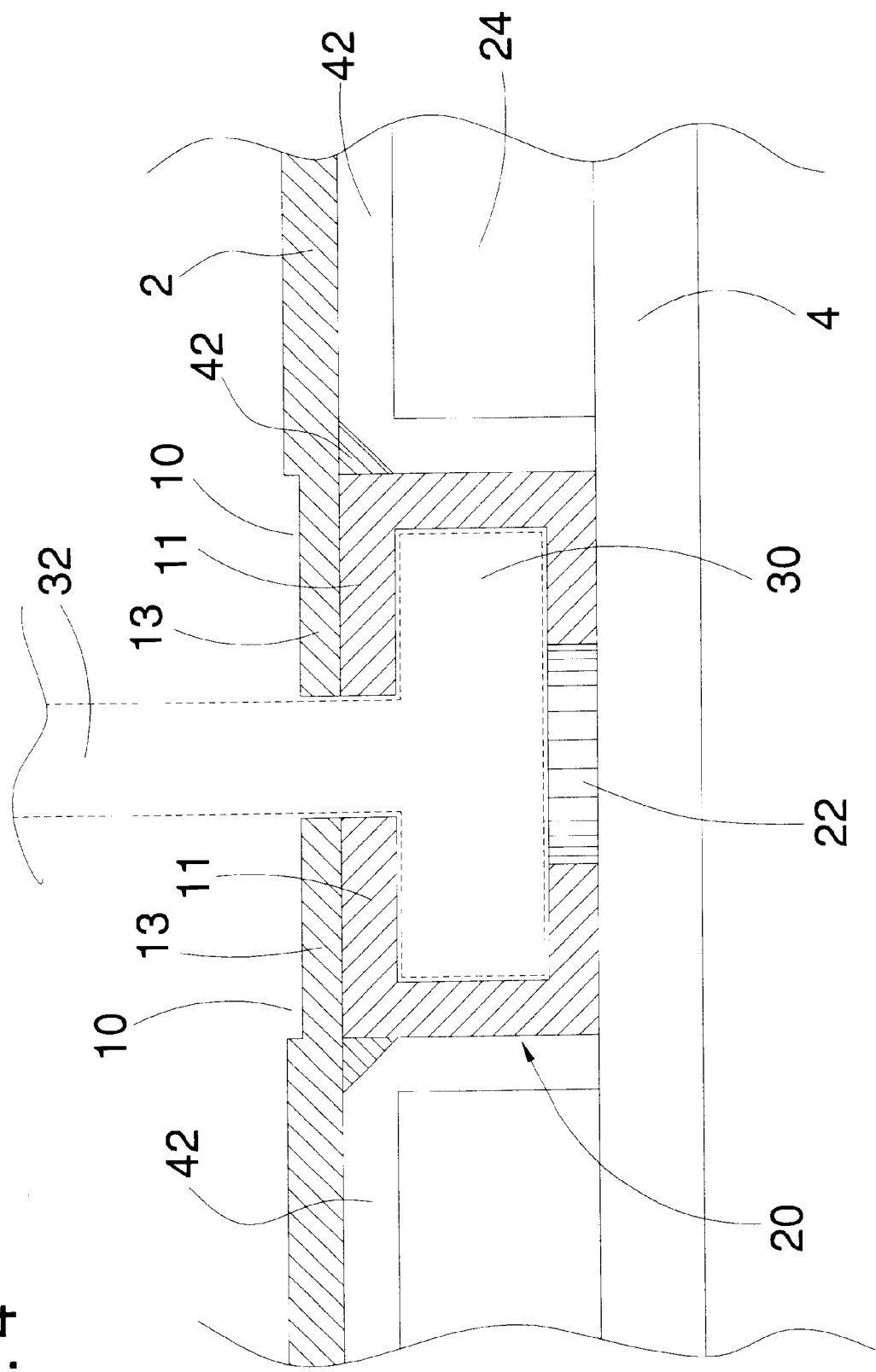
FIG. 4 redepicts FIG. 3 showing an exemplary T-flange installation.

Referring simultaneously to FIGS. 1 and 4, a T-flange having an upwardly extending post or web 32 and having a lower perpendicularly oriented "T" 30 may be slidably inserted into channel openings 6 or 14. Upon such slidable insertion, the floor of C-channel beams 20 or 24 restricts downward motion of such T-flange, the inwardly extending flanges 11 of such beams restrict upward motion of such T-flange, and the side walls of such beams prevent lateral or longitudinal motion, as the case may be, of such T-flange. In the event that frictional forces between the "T" 30 and the inner walls of the T-receiving channel 28 are insufficient to resist sliding motion of the T-flange along the T-receiving channel 28, screw clamping means (not depicted) attached to web or post 32, and configured for driving a clamping face downwardly upon the surface of left or right race 10, may be utilized to resist longitudinal sliding motion of the T-flange.

Referring simultaneously to FIGS. 1 and 4, where the T-flange comprises a circular cylindrical post 32, and where it is desirable to slidably move such post 32 along a longitudinally extending post receiving slot 12, and thence along a laterally extending post receiving slot 16, it is preferred that "T" 30 be configured as a disk. Alternately, where the upwardly extending element of the T-flange forms a flange or web, the "T" 30 is preferably configured as a square or a rectangle.

Referring to FIG. 4, the post or web 32 may be conveniently utilized for supporting an eye or loop (not depicted), for supporting a storage box (not depicted) or for supporting variously configured equipment carrying brackets (not depicted).

Figure 5:
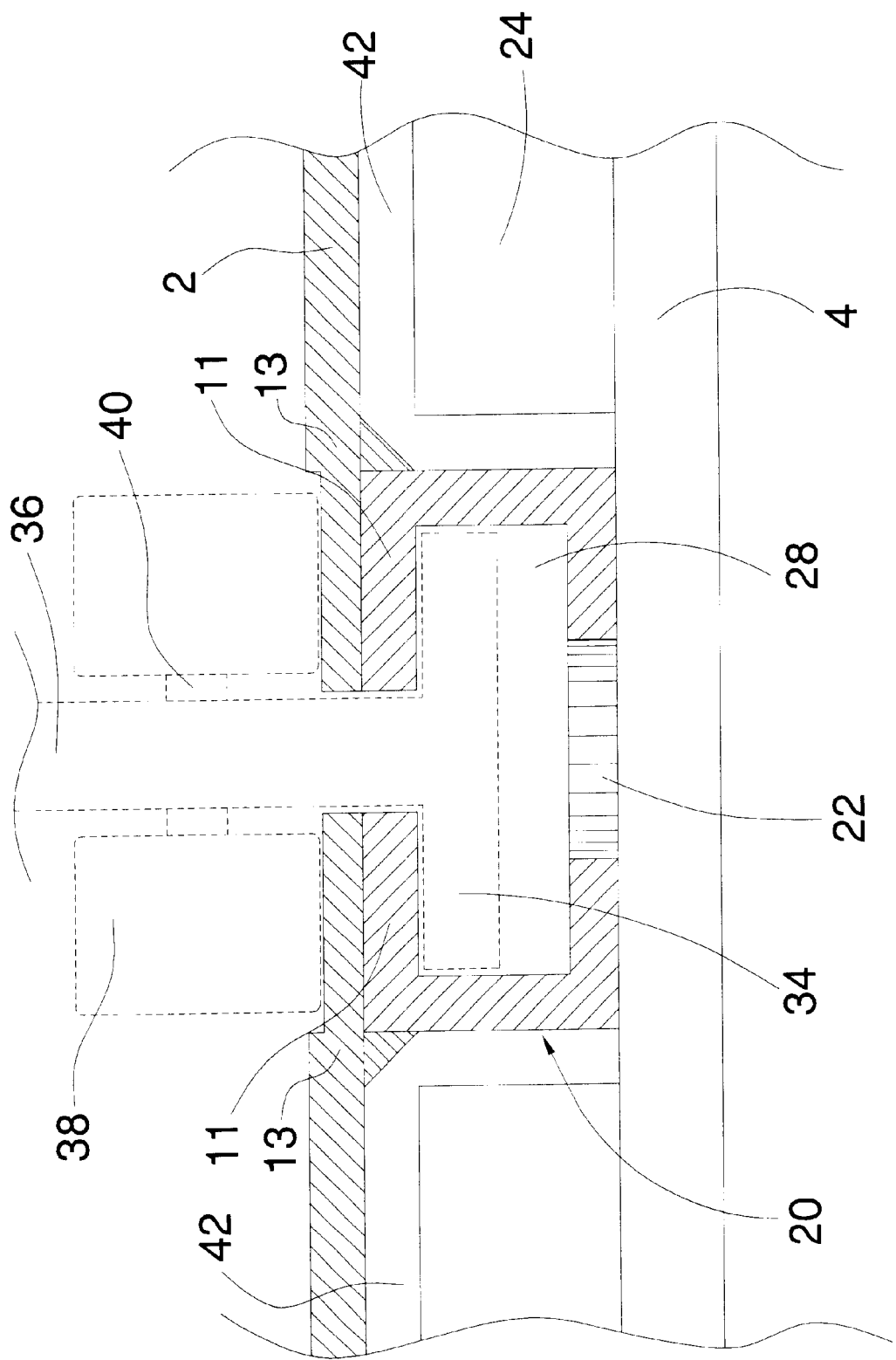
FIG. 5 redepicts FIG. 3 showing an alternate T-flange and roller installation.

Referring to FIGS. 4 and 5, the post or web 36 of the T-flange may be conveniently configured for supporting a laterally extending axle 40 upon which rollers 38 are rotatably mounted. Through utilization of such rollers 38, equipment boxes or brackets supported by web 36 may be conveniently rollably moved along races 10 while "T" 34 resists lateral and upward motion of the T-flange.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A T-flange engaging load bearing bed comprising:
   (a) a sheet having an upper load bearing surface and a lower surface, the sheet having at least a first post receiving slot, the at least first post receiving slot having a lateral dimension;
   (b) at least a first C-channel beam having an upwardly opening T-receiving channel, said channel having a lateral dimension, the lateral dimension of said channel being greater than the lateral dimension of the at least first post receiving slot; and,
   (d) attaching means, the attaching means positioning the at least first C-channel beam upon the lower surface of the sheet so that said beam's upwardly opening T-receiving channel underlies the at least first post receiving slot; the attaching means comprising fasteners selected from the group of heat fusion welds, rivets, spirally threaded bolts, spirally threaded screws, and adhesives; the at least first post receiving slot having a left and a right edge, and the at least first C-channel beam comprising left and right inwardly extending flanges, the upwardly opening T-receiving channel of said beam opening between said inwardly extending flanges, the attaching means further positioning said beam so that its left and right inwardly extending flanges underlie the sheet leftwardly from and rightwardly from the left and right edges of said slot respectively; the upper load bearing surface of the sheet comprising left and right roller receiving races, the left and right roller receiving races being respectively positioned to the left of and to the right of the at least first post receiving slot.

2. The bed of claim 1 wherein the left and right inwardly extending flanges each have a substantially flat upper surface, each such flange being positioned in contact with the lower surface of the sheet.

3. The bed of claim 2 wherein the at least first C-channel beam comprises a floor, said floor having a plurality of clean out apertures.

4. A T-flange engaging load bearing bed comprising:
   (a) a sheet having an upper load bearing surface and a lower surface, the sheet having a plurality of substantially parallel post receiving slots, each slot among said plurality of slots having a lateral dimension;
   (b) a plurality of C-channel beams, each beam among said plurality of beams having an upwardly opening T-receiving channel, each such channel having a lateral dimension, the lateral dimensions of said channels being greater than the lateral dimensions of said slots; and, (c) attaching means, the attaching means positioning each beam among the plurality of C-channel beams upon the lower surface of the sheet so that each of said beams' upwardly opening T-receiving channels underlies one of said post receiving slots; the attaching means comprising fasteners selected from the group of heat fusion welds, rivets, spirally threaded bolts, spirally threaded screws, and adhesives; each slot among the plurality of post receiving slots has a left and a right edge, and wherein each beam among the plurality of C-channel beams comprises a left and a right inwardly extending flange, the upwardly opening T-receiving channel of each such beam opening between said inwardly extending flanges, the attaching means further positioning each such beam so that its left and right inwardly extending flanges underlie the sheet leftwardly from and rightwardly from the left and right edges of one of said slots respectively; the upper load bearing surface of the sheet comprising a plurality of left and right roller receiving races, each left and right roller receiving race among said plurality of races being respectively positioned to the left and to the right of one of the post receiving slots.

5. The bed of claim 4 wherein each of the left and right inwardly extending flanges has a substantially flat upper surface, each such flange being positioned in contact with the lower surface of the sheet.

6. The bed of claim 5 wherein each beam among the plurality of C-channel beams comprises a floor, each floor having a plurality of clean out apertures.

7. A T-flange engaging load bearing bed comprising:
(a) a sheet having an upper load bearing surface and a lower surface, the sheet having a first plurality of substantially parallel post receiving slots, each slot among said first plurality of slots having a lateral dimension, the sheet further having a second plurality of substantially parallel post receiving slots, each slot among said second plurality of slots having a lateral dimension, the first and second pluralities of slots being substantially perpendicular to each other;
(b) a plurality of C-channel beams, each beam among said plurality of beams having an upwardly opening T-receiving channel, each such channel having a lateral dimension, the lateral dimensions of said channels being greater than the lateral dimensions of said slots; and,
(c) attaching means, the attaching means positioning each beam among the plurality of C-channel beams upon the lower surface of the sheet so that each beam's upwardly opening T-receiving channel underlies one of the slots among the first and second pluralities of post receiving slots; the attaching means comprising fasteners selected from the group of heat fusion welds, rivets, spirally threaded bolts, spirally threaded screws, and adhesives; each slot among the first and second pluralities of post receiving slots having a left edge and a right edge or a forward edge and a rearward edge, and wherein each beam among the plurality of C-channel beams comprises left and a right or forward and rearward inwardly extending flanges, the upwardly opening T-receiving channel of each such beam opening between said flanges, the attaching means further positioning each such beam so that its left and right or forward and rearward inwardly extending flanges underlie the sheet leftwardly and rightwardly from or forwardly and rearwardly from the left and right or forward and rearward edges of one of said slots respectively; the upper load bearing surface of the sheet comprising a plurality of left and right or forward and rearward roller receiving races, each left and right or forward and rearward roller receiving race among said plurality of races being respectively positioned to the left and to the right of or forwardly from and rearwardly from one of the post receiving slots.

8. The bed of claim 7 wherein each of the left and right or forward and rearward inwardly extending flanges has a substantially flat upper surface, each such flange being positioned in contact with the lower surface of the sheet.

9. The bed of claim 8 wherein each beam among the plurality of C-channel beams comprises a floor, each floor having a plurality of clean out apertures.

* * * * *